OR 4,002,405

United States
Stahl

[11] 4,002,405
[45] Jan. 11, 1977

[54] VARIABLE SPEED CONTROL FOR ZOOMING

[76] Inventor: Curt Stahl, 1 Gilmore Court, Scarsdale, N.Y. 10583

[22] Filed: Apr. 3, 1975

[21] Appl. No.: 564,917

[52] U.S. Cl. .............................. 350/187; 350/255; 354/195
[51] Int. Cl.² ..................... G02B 15/00; G03B 3/00
[58] Field of Search ........... 350/187, 255; 354/195, 354/197

[56] References Cited
UNITED STATES PATENTS

| | | | |
|---|---|---|---|
| 3,347,985 | 10/1967 | Barr et al. | 354/195 |
| 3,765,748 | 10/1973 | Mito | 350/187 |

Primary Examiner—John K. Corbin
Assistant Examiner—Conrad Clark
Attorney, Agent, or Firm—Henry Sternberg

[57] ABSTRACT

A variable speed drive for controlling the movement of the zoom component of a zoom lens system such that the speed of zooming will be proportional to the amount of manual displacement of a control member. The same manually operable control member which controls the speed, the amount and the direction of zooming also controls the position of the focusing component so that focusing as well as selectively varying the speed and amount of zooming can all be effected by a single control member.

12 Claims, 4 Drawing Figures

VARIABLE SPEED CONTROL FOR ZOOMING

BACKGROUND OF THE INVENTION

The present invention relates to an apparatus for relative adjustment of axially-spaced lens components of an optical system and more particularly to such an apparatus wherein selectively changing the speed and amount of magnification and adjusting the focus can be effected by a single control member.

In the prior art, it is well-known that an objective lens component for focusing and a zoom lens component for zooming, and a compensating lens component, are spaced apart and are movable axially, relative to a basic lens component mounted on a fixed frame in the optical system. It is also well-known, as for example, shown in U.S. Pat. No. 3,765,748 to Mito that both focusing and zooming can be effected with a single control member. In the structure disclosed by Mito displacement of an operating member in the axial direction thereof controls zooming while rotation of the same member about its axis effects focusing. However, in Mito the mechanism for zooming and focusing is mechanically coupled to the operating member so that the amount of magnification is directly proportional to the axial displacement of the operating member and the amount of movement of the focusing component is directly proportional to the amount of the rotation of the operating member.

Similarly, in the patent to Back U.S. Pat. No. 3,455,628 a movable ring is mounted for both longitudinal movement and rotational movement. The movable ring is directly mechanically coupled to the zoom component and to the focusing component for moving either or both of the latter depending upon the movement imparted to the operating member. The amount of displacement of both the focusing or zooming component in the latter prior art construction is directly proportional to the amount of displacement longitudinally or rotationally, as the case may be, of the movable ring.

While it is also known, for expensive and large lens systems, such as, for example, those used with television cameras, to drive the zoom component with an electric motor drive, these drives are usually not speed adjustable and in those instances where a variable speed drive is provided the operator is required, in advance, to choose one of a plurality of speed settings prior to zooming and thereafter to control zooming with an on-off switch.

In another prior art device, namely U.S. Pat. No. 3,241,470 to Brolde, there has been disclosed a drive system for lenses in which an electric drive motor is connected in series with an adjustable resistor. The circuitry disclosed is stated to be such as to maintain a constant driving speed at any speed which is preselected.

Not only, therefore must the operator when using one of these prior art devices use one hand for operating the zoom control switch (after having preset a selected speed for the zooming) but requires his other hand for the focusing adjustment. It should be noted here that while zoom systems almost invariably contain focus compensating lenses for roughly adjusting the focus by "tracking" the zoom lens movement, nevertheless, manual fine focusing is invariably required. Manual focusing is also required for focusing on objects at different distances.

In the case of two separate operating members for focusing and zooming, third functions, for example, color adjustments (for color television), video level adjustments, iris control adjustments and others become extremely difficult since both the operator's hands are already required for manipulating the separate zoom and focus controls.

THE OBJECT OF THE INVENTION

One object of the present invention is to provide a zoom control system which permits the operator to select a zoom speed within a given range and can continuously vary such speed while zooming.

Another object of the present invention is to provide a lens control system which has a single manual control member capable of causing the lens system to zoom at any speed which may be selected by the operator and at any different speed or speeds which the operator may choose during zooming and which is further capable of adjusting the focus while zooming.

A further object of the present invention is to provide a zoom lens control system which is so constructed that by moving a single operating member in the direction of the optical axis of the lens system, the adjustments for zoom speed and magnification are effected, and by rotating said member about said optical axis adjustment for focusing is effected.

A concomitant object of the present invention is to provide a simple and cheap electronic system for deactivating a drive motor whenever such motor, or a member driven thereby reaches an end position and places the motor in stall condition.

Still further objects of the present invention will be obvious from the detailed description of the embodiments set forth below.

SUMMARY OF THE INVENTION

In order to attain the objectives mentioned above, the present invention relates to a control system for controlling the speed of zoom, the amount of magnification of zoom, and the fine focusing all with a single control member. The single control member is mounted for movement between a null position and a plurality of spaced positions on each side of said null position. The null position of the control member corresponds to zero speed of the zoom component and each of the positions on one side of the null position corresponds to a respectively different speed of the zoom component in a direction to increase magnification, while each of the positions on the other side of the null position corresponds to a respectively different speed of the zoom component in a direction to decrease magnification. A drive motor capable of being driven at variable speed is provided for driving the zoom component along its optical axis toward and away from a given focal plane in response to movement of the control member to selected ones of its positions.

In the preferred embodiment the control member is in the form of a cylindrical sleeve which is longitudinally slidably supported on a fixed frame and is rotatable about the optical axis of the lens system.

The control member is electrically connected to an electric motor for driving the zoom component at speeds directly proportional to the amount of displacement of the control member out of its null position and in a direction determined by the direction of displacement of the control member, out of said null position thereof. Axial movement of the control member out of its null position energizes the drive motor to drive the zoom component along its optical axis, relative to the fixed frame, causing the optical system to change its total focal length to effect zooming. Movement of said zoom component along its optical axis ceases upon return of said control member to its null position. Rotation of the control member about the optical axis results in movement of the focusing component, through a helicoid mechanism, along the optical axis to focus the optical system precisely on an object at a predetermined distance.

DESCRIPTION OF THE PREFERRED EMBODIMENT

Figure 1:
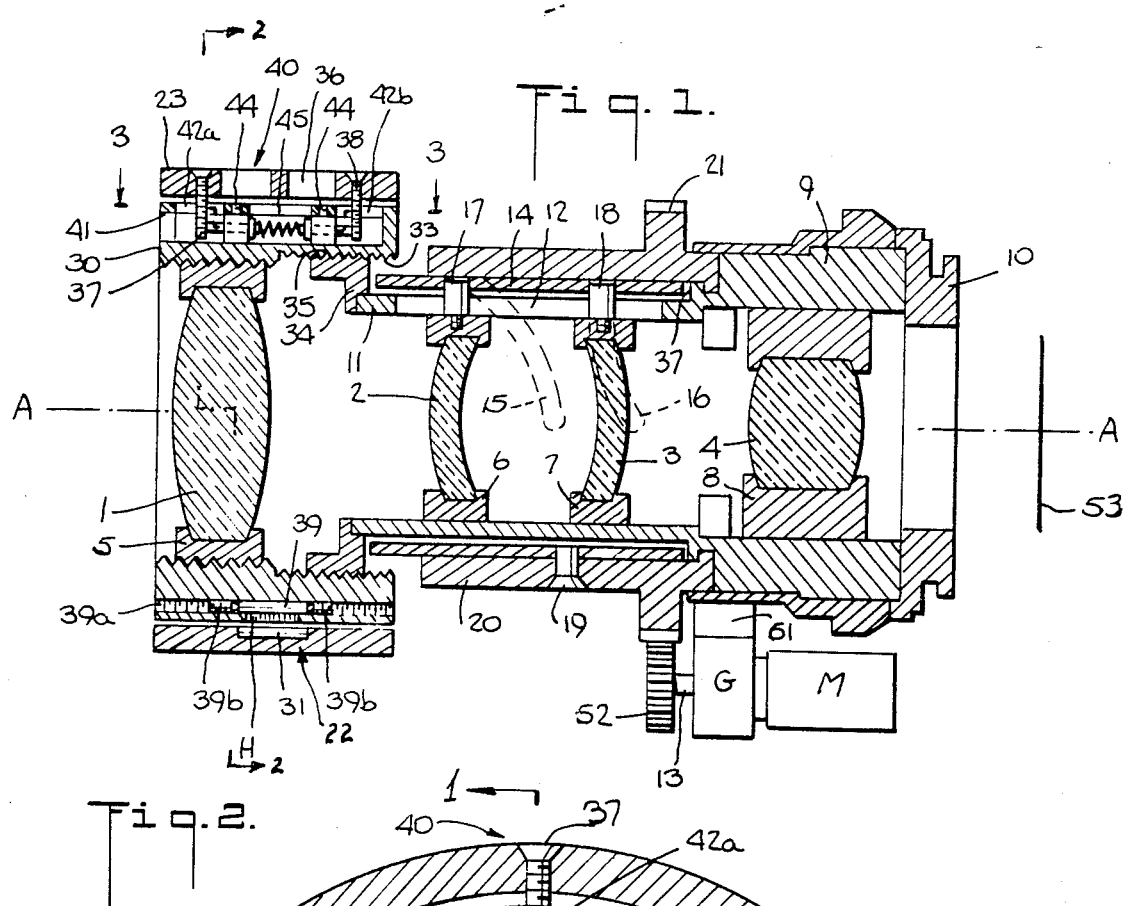
FIG. 1 is an axial section of the preferred embodiment in accordance with the present invention taken along line 1—1 of FIG. 2 in the direction of the arrows.

The lens system according to the present invention comprises a focusing lens component 1, positioned most closely to the object side and mounted on focusing component frame 5, a zooming lens component 2 mounted on zooming component frame 6, a compensating lens component 3 mounted on compensating component frame 7, and a basic lens component 4 for forming an image at a focal plane 53 is mounted on basic component frame 8. The lenses of the respective components are optically co-axial. Each respective lens component is shown simply and typically by a single lens; however, in practice each of these is usually formed by a plurality of lenses.

The basic component frame 8 is fixed to a fixed frame 9 in a position close to the image side thereof, i.e., nearest the focal plane 53. Attached to the end of the image side of frame 9 is a fitting 10 for mounting the lens system on a photographic camera, motion picture camera or television camera, using said optical system as an objective lens. The object side of frame 9 has threadedly fixedly secured thereto a cylinder 11, to the object end of which a screw ring 34 is secured. The cylinder 11 is provided with a slot 12 extending in the axial direction thereof.

On the inner periphery of cylinder 11 the zooming component frame 6 and the compensating component frame 7 are slidably fitted, and on the outer periphery of said cylinder 11, cylinder 14 is rotatably fitted. The axial movement of actuating cylinder 14 relative to cylinder 11 is restrained between a step 37 on cylinder 11, and the end edge of screw ring 34, respectively. Thus, while being restrained axially cylinder 14 can be freely turned about the optical axis A—A having a sliding fit over the thin cylinder 11.

Actuating cylinder 14 is provided with spirally formed cam slot 15 into which the head of pin 17, mounted on zooming component frame 6 and extending through slot 12 of cylinder 11 projects, and a second cam slot 16 into which the head of pin 18 mounted on compensating component frame 7 and also extending through slot 12 projects.

On the outer periphery of control cylinder 14 for rotation therewith there is fixed by a pin 19 a drive sleeve 20. Drive sleeve 20 is formed at the image end of its outer periphery with a gear portion 21.

Fixedly connected to the stationary frame 9 is an outwardly extending bracket 61 carrying a motor M and associated gear head G in spaced relation to said frame 9. On the output shaft 13 of the gear head G is positioned a drive gear 62 which meshes with the gear 21 so as to provide a driving connection between the motor M and drive sleeve 20. As is well-known Gear head G contains reduction gearing for providing the torque necessary for rotating sleeve 20.

On the outer periphery of screw ring 34, fixed to the end portion of the object side of cylinder 11, a thread 35 is provided for engagement with thread 33 of focusing ring 30 and by the engagement of threads 33 and 35 a helicoid mechanism is formed.

A control means in the form of control sleeve 23 is disposed outwardly of focusing ring 30 and is slidable with respect thereto in opposite axial directions from the null position in which it is illustrated in FIG. 1.

Figure 2:
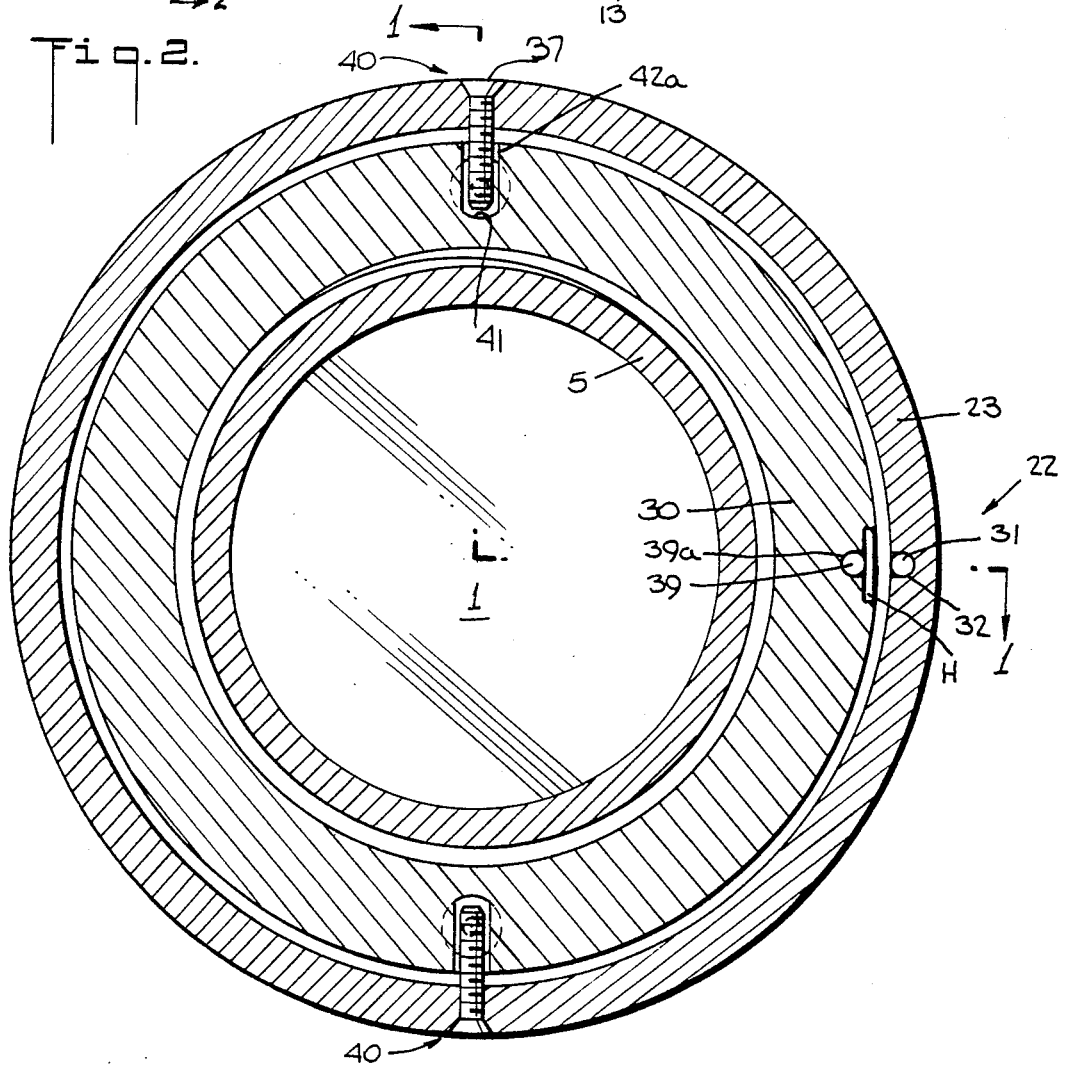
FIG. 2 is an enlarged transverse sectional view of the embodiment of this invention illustrated in FIG. 1., taken along the line 2—2 in the direction of the arrows.
Figure 3:
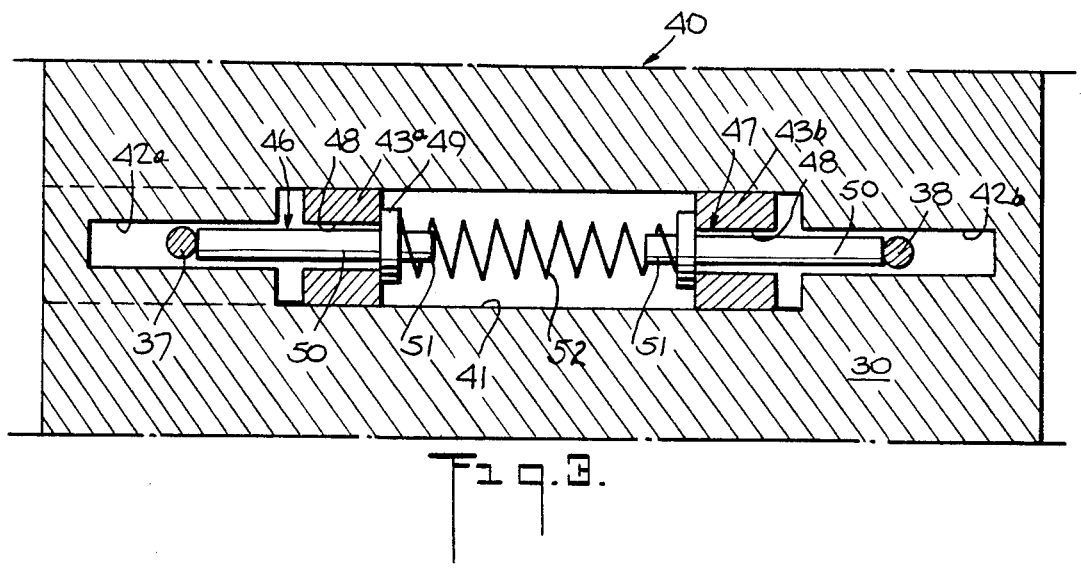
FIG. 3 is an enlarged view of the spring mechanism for urging the control member of the present invention toward its "null" position, taken along line 3—3 in FIG. 1 in the direction of the arrows.

The null positioning mechanism illustrated in FIG. 3 for permitting control sleeve 23 to be displaced axially with respect to focusing ring 30 while transmitting all rotational movement directly to ring 30 is located partly on sleeve 23 and partly on ring 30 as follows:

As seen in FIG. 2 there are preferably provided two such mechanisms 40 diametrically opposite. Since however, these mechanisms are identical to each other only one will be described. Null positioning mechanism 40 comprises an axially directed bore 41 in ring 30 near the outer periphery thereof. A pair of spaced axially directed slots 42a and 42b in linear alignment with one another on the periphery of ring 30 extend to and communicate with bore 41. A pair of cylindrical collars 43a and 43b are secured in spaced relation in bore 41 with set screws 44. An access opening 45 is preferably provided in the periphery of ring 30 intermediate the axial slots 42 so as to permit axial adjustment of the collars 43a and 43b prior to securing these with the set screws.

The set screws 44 extend through and are threadedly received in the thin top wall of the bore 41 to retain the collars 43a and 43b in fixed position after proper adjustment thereof. Suitable openings 36 may be provided in the control sleeve 23 for access to the set screws 44. A pair of pins 37 and 38 are secured to sleeve 23 and extend radially inwardly through the latter and through the slots 42a and 42b, respectively, into spaced portions of the bore 41 at opposite sides of the pair of collars 43a and 43b. A plunger 46 extends through an axial bore 48 in collar 43a, while another identical plunger 47 extends through an axial bore 48 in collar 43b. Each of the plungers 46 and 47 has a head portion 49 located in the space between the pair of collars 43a and 43b, a stem portion 50 attached to the flange portion and extending outwardly through the respective collar, and a central protrusion 51 facing toward the interior of the chamber formed between the pair of collars 43a and 43b. The pins 37 and 38 extend a sufficient distance into the corresponding slots 42a and 42b so as to engage the outer free ends of the stem portions 50 of the plungers 46 and 47, respectively.

A biasing means preferably in the form of a linear coil spring 52 is positioned in the bore 41 intermediate of and having its opposite ends in abutment with the opposed inwardly facing surfaces of the head portion 49 of the plungers 46 and 47 respectively, with each end of the spring surrounding the corresponding one of the protrusions 51. The action of spring 52 is such that it will at all times urge the head portion 49 of each of the plungers 46 and 47 outwardly in the direction of and into abutment with the corresponding collar 43a and 43b through which its stem extends.

Figure 4:
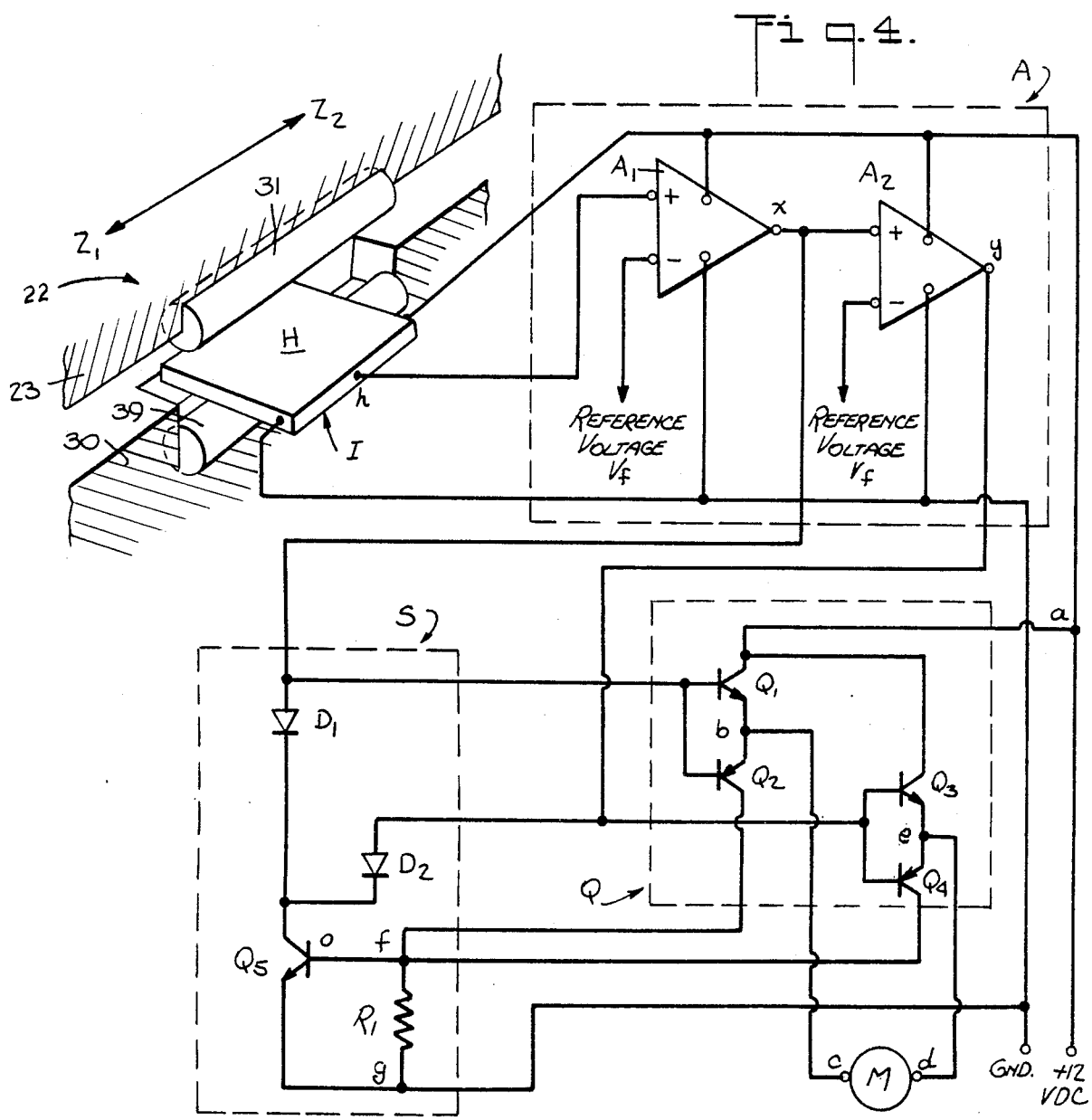
FIG. 4 is an enlarged perspective, partly cut-away view showing the electro-magnetic sensing means according to the preferred embodiment of the present invention illustrated in FIG. 1, together with a partly schematic partly block diagram showing the major components of the electric circuit according to the preferred embodiment of the present invention.

As illustrated in FIG. 2 and FIG. 4, the sensing means 22 for detecting the axial displacement of control sleeve 23 comprises a first permanent magnet 31 affixed to the control sleeve 23 adjacent the interior peripheral surface thereof. The magnet 31 is elongated and is preferably located in a bore 32 which extends in axial direction at least part way through the non-magnetizable preferably aluminum control sleeve 23 preferably from the object side thereof. A second elongated permanent magnet 39 is positioned on non-magnetizable, preferably aluminum focusing ring 30 near the outer periphery thereof so as to also extend in axial direction parallel to and directly opposite the magnet 31 and in substantial alignment therewith, with the like poles of the pair of magnets 31, 39 adjacent to one another. Magnet 39 is located in an axially extending bore 39a which is internally threaded. The axial position of magnet 39 may be adjusted by means of a pair of screws 39b located in bore 39a on opposite sides of magnet 39. The pair of magnets 31, 39 form a sensing device when combined with a so-called "Hall effect" transducer in the form of a rectangular wafer H embedded in the outer periphery of the focusing ring 30 intermediate the pair of magnets 31 and 39. The wafer H is connected in circuit to a suitable source of 12 Volt D. C. power and to the D. C. motor M.

The circuitry, which will be described in more detail below and which is illustrated in FIG. 4 is such as to drive the motor M, and thereby the zooming and compensating components 2 and 3, at a rate of speed which is directly proportional to the magnitude of the displacement of the control sleeve 23 out of its null position and in a direction responsive to the direction of displacement of sleeve 23 out of its null position. The null position being the position illustrated in FIGS. 1 and 3 in which both of the head portions 49 of the plungers 46 and 47 are in abutment with the corresponding collar 43a, 43b. In the null position of control sleeve 23, the sensing means 22 shown in FIG. 4 is in the position there illustrated, i.e., with the permanent magnets 31 and 39 in alignment with one another at opposite sides of the Hall effect transducer H.

It will be apparent that the ring 23 may be manually displaced axially to the right or to the left as viewed in FIG. 1 and that during such displacement the pins 37 and 38 will ride in the slots 42a and 42b respectively, of the focusing ring 30. Movement of sleeve 23 toward the left will cause the pin 38, FIG. 3, to push against the stem 50 of the plunger 47 to move the latter toward the left. Meanwhile pin 37 will also move to the left but plunger 46 will not move since it is restrained by collar 43a from following pin 37 to the left.

Consequently the action of the spring 52 will be to bias the plunger 47 toward the right. This spring force is transmitted by the plunger 47 to the pin 38 and thereby to the control sleeve 23 for urging the latter toward the right (as viewed in FIG. 1) back towards its null position illustrated in FIGS. 1 and 3, as soon as the manual force on the control sleeve 23 is released. Similarly manual movement of the operating ring 23 toward the right, as viewed in FIG. 1, will cause pin 37 to push the stem 50 of plunger 46 towards the right, as viewed in FIG. 3, once again compressing the spring 52. Consequently, as soon as the operator releases the control sleeve 23, spring 52 will urge the plunger 46 and therewith the pin 37 and sleeve 23 toward the left, back to the illustrated null position. Thus, it will be seen, that any axial displacement of the control sleeve 23, out of its illustrated null position, irrespective of whether it is in a direction toward the object side or in a direction toward the image side, is always in opposition to the force of spring 52 and as soon as the operator releases the control sleeve 23, the latter will be returned to its null position by the spring 52.

In operation, when sleeve 23 is rotated manually, or by any other means, relative to fixed frame 9, the pins 37 and 38 engage with the side walls of the slots 42a and 42b respectively to transmit the turning force thereto and focusing ring 30 is rotated about its axis as a center, and by the helicoid mechanism of threads 33 and 35 focusing component frame 5 is moved along the optical axis relative to fixed frame 9. Therefore, in the case of pure rotation of the control sleeve 23, zooming of the optical system is not effected and only focusing is effected.

On the other hand, when control sleeve 23 is axially moved, relative to fixed frame 9, the guide pins 37 and 38 slide along the corresponding slots 42a and 42b and the movement thereof is not transmitting to focusing ring 30. Axial displacement of the control sleeve 23, however, results not only in compression of spring 52, as described above but also in displacement, in axial direction of the permanent magnet 31 with respect to the permanent magnet 39, FIG. 4. As noted above, the sensing means 22, FIGS. 2 and 4 is comprised of the magnets 31 and 39 and a linear Hall effect transducer element H and is capable, as is well-known in the art, of sensing not only the direction of displacement i.e., whether magnet 31 is displaced in the direction $Z_1$ or $Z_2$ FIG. 4, with respect to wafer H, but also sensing the magnitude of such displacement in either such direction. The electric circuitry, illustrated in FIG. 4, is such that when the control sleeve 23 is displaced forward, i.e., toward the object, the motor M is energized to rotate the drive sleeve 20 and therewith the cylinder 11 secured thereto about the axis A—A in a direction of rotation which will, in the preferred embodiment of this invention, move the zooming component in a direction to zoom in on the object. The "Hall effect" transducer H, together with the circuitry illustrated in FIG. 4 further results in the speed of rotation of the drive sleeve 20, to be proportional to the amount of axial displacement of sleeve 23 out of its null position. Thus, if the operator manually displaces sleeve 23, only slightly forward out of its null position, the motor M is energized for slow rotation of the drive sleeve 20. If the operator moves the control sleeve 23, further and further axially in the direction of the object, motor M will drive the drive sleeve 20 and thus the zooming component at greater and greater speed depending on the amount of such displacement.

Similarly, displacement of the control sleeve 23 out of its null position in a direction towards the image side of the lens system results first in slow and then in faster and faster rotational speed of motor M, in linear proportion to the amount of displacement of the control sleeve 23 out of its null position, with motor M now rotating in a direction opposite to the above-mentioned direction of rotation for moving the zooming component in a direction to decrease magnification of the image. Since actuating cylinder 14 is fixed to drive sleeve 20 by the pin 19, the control cylinder 14 is rotated in one direction by forward displacement of the control sleeve 23 and in the opposite direction by rearward displacement of control sleeve 23. Thus, the first cam slot 15 and the second cam slot 16 are turned. Pin 17, engaged in the first cam slot 15 and in linear slot 12, to make only an axial displacement, makes an axial displacement in one direction in response to a first directional turning, and an axial displacement in the opposite direction in response to the opposite directional turning, at the same time, pin 18 engaged in the second cam slot 16 and linear slot 12 to make only an axial displacement, makes an axial displacement in one direction through a first directional turning and an axial displacement in the opposite direction through the opposite directional turning.

As a result, zooming component frame 6 carrying the pin 17 slides in cylinder 11 to make an axial displacement in one or the other direction and compensating component frame carrying pin 18 also slides in cylinder 11 to make an axial displacement in one or the other direction. The displacement of both frames 6 and 7 in the direction of the image side zooms the optical system to the short focal length side and the displacement in the direction of the object side zooms the optical system in the long focal length side.

Thus, the operator, by selecting any of an infinite number of axial positions of the control sleeve 23 can determine not only the direction of the zooming i.e., whether the zooming will be to the short focal length side or to the long focal length side but also simultaneously determine the speed at which such zooming takes place. Moreover, as soon as the system has zoomed to the focal length desired by the operaor the operator need merely release control sleeve 23 for it to return, in response to the urging of spring 52, to its null position, thereby de-energizing motor M and ceasing further drive of the zoom system. Whenever control sleeve 23 returns to its null position the zoom component remains in the position to which it had been driven just prior to such return of control sleeve 23 to said null position. Moreover, in accordance with the present invention the operator can vary the amount of displacement out of null position of sleeve 23 even during the zooming operation, thus varying, even during a zooming cycle, the speed with which zooming is taking place.

For example, the operator may displace the sleeve 23 forward to its maximum forward displacement thereby beginning to zoom at maximum speed and prior to reaching the desired magnification the operator may slowly release the sleeve 23 permitting it to move toward its null position thereby slowing the zooming down but still permitting the zooming operation to continue at such slower speed until the desired magnification is achieved. Thus, the latter part of the zoom cycle may be at a slower speed than the first, or vice versa, as desired by the operator. Meanwhile, at any given zoom position, or even during a zoom cycle, by rotation of the same sleeve 23 which the operator is grasping for purposes of zooming, the operator may adjust the focus as desired, with the same hand. The electric circuit illustrated in FIG. 4 shall now be described.

The electric circuitry for accomplishing the foregoing is illustrated in FIG. 4 and basically consists of the following three stages: an input stage, I; an amplification stage A which includes a preamplifier $A_1$ and an invertor $A_2$; a current sensing motor cut-off-stage S and an output stage Q.

According to the preferred embodiment of the present invention the input stage I is in the form of a "Hall effect transducer" of a type well-known to those skilled in the art and therefore not described in detail herein other than to state that the output voltage at terminal $h$ of the transducer H will be positive or negative with respect to a given reference voltage $V_f$ depending on whether the movable magnet 31 is displaced in the direction $Z_1$ or $Z_2$ out of the "null" position in which it is illustrated in FIG. 4. If the voltage at $h$ is positive with respect to reference voltage $V_f$ then the voltage at output terminal $x$ of $A_1$ will be negative and the voltage at the output terminal $y$ of inverter $A_2$ will be positive. On the other hand, if $h$ is negative with respect to $V_f$, $x$ will be positive and $y$ negative.

As described above, transducer H is position responsive, so that the larger the displacement of magnet 31 out of its null position, the larger will be the differential between the output voltage at $h$ and the reference voltage $V_f$ and consequently the faster will be the drive speed of Motor M. Or course, other displacement detecting devices such as, for example, a potentiometer or a photo electric sensing device, while not preferred, could be used in place of the Hall device. In its preferred form the Hall device uses a plus 12 volts D. C. input and is biased at plus 6 volts, i.e., the reference voltage $V_f$ is plus 6 volts. In operation, when control member 23 is displaced from its null position and moved in the direction of the object side of the lens system, the voltage output at $h$ increases to some value greater than 6 volts. On the other hand, when operating member 23 is displaced from its null position in the direction of the image side of the lens system the voltage at $h$ will decrease to some value below the 6 volts reference voltage $V_f$. The voltage output at $h$, which equals the differential between the null position voltage and the reference voltage $V_f$ is then amplified by amplifier $A_1$ and inverted by inverter $A_2$. Thus, when control sleeves 23 is manually displaced in one axial direction out of its null position, current flows through motor M in direction $c$ to $d$ and if the control sleeve is displaced out of its null position in the opposite axial direction, current flows through Motor M in direction $d$ to $c$.

The output section Q consists of four transistors $Q_1$, $Q_2$, $Q_3$ and $Q_4$ in a bridge network. In order to drive motor M in a first direction of rotation, transistors $Q_1$ and $Q_4$ are rendered conductive by applying a positive voltage to the base of $Q_1$ and a negative voltage to the base of $Q_4$. As a result the current flow is in the direction $a, b, c, d, e, f, g$ (FIG. 4). If the direction of rotation of Motor M is to be reversed, $Q_2$ is rendered conductive by applying a negative voltage to its base and a positive voltage is applied to the base of $Q_3$, rendering transistors $Q_2$ and $Q_3$ conductive and thus reversing the direction of current flow through motor M so as to drive it in the opposite direction of rotation.

The current sensing motor cutoff stage S comprises a resistor $R_1$, a pair of diodes $D_1$ and $D_2$ and a transistor $Q_5$. Resistor $R_1$ is employed as a current sensing resistor and performs this function irrespective of the direction of rotation of Motor M. Should the lens members, for example, the zooming component frame 6, driven by Motor M, reach their end position or any other position beyond which they are mechanically or otherwise restrained from moving, current drawn by Motor M, i.e., the "stall" current will be substantially greater (for example, eight to ten times greater) than the motor drive current. Therefore, under such stall condition of Motor M, the base of transistor $Q_5$ becomes positive, rendering transistor $Q_5$ conductive. This causes current to flow thru either diode $D_1$ or $D_2$, depending upon the direction in which Motor M was then being driven. When either diode $D_1$ or $D_2$ becomes conductive, the motor drive current flowing thru $Q_1$ and $Q_4$ or $Q_2$ and $Q_3$, as the case may be, is substantially reduced and therefore the current thru the motor is limited to a value sufficiently small to prevent damage. The circuitry is such, however, that even when transistor $Q_5$ is rendered conductive as described above so that most of the current thru diode $D_1$ or $D_2$, as the case may be, will flow to ground, clamping to ground either transducer pair $Q_1$ and $Q_4$ or $Q_2$ and $Q_3$ as the case may be, sufficient current continues to flow thru the motor circuit to maintain transistor $Q_5$ conductive yet such continuing current flow will not be too large as to damage the motor. The motor will, however, not be re-energized beyond the small current flow just described, until current is once more caused to flow thru the motor in the direction opposite to that direction of current flow which drove the motor into stall condition. Assuming that the Motor M was initially driven in one direction of rotation by displacing control sleeve 23 out of its null position in the direction of the object resulting in current flowing thru $Q_1$ and $Q_4$ and driving the lens system to one end position then by displacing the control sleeve 23 in the opposite direction, beyond its null position, $Q_2$ and $Q_3$ are rendered conductive, causing the voltage at the anode of $D_1$ to become negative instead of positive and the motor would rotate in the opposite direction of rotation until the driven lens member reaches its opposite end position. At that point $R_1$ would again sense the stall current and the above described sequence for reducing the stall current would be repeated.

As shown in the embodiment described above, the present invention is characterized in that zooming can be effected by moving a control member axially and focusing adjustment can be effected by turning the same control member. Furthermore, with the same control member which effects the zooming, the operator can instantaneously control and vary even during zoom cycle, the speed with which zooming takes place.

According to another embodiment of the present invention, the focusing lens component is also motor driven preferably by a second drive motor (not shown) and the control member instead of being supported coaxially with the lens system may be mechanically and physically separate therefrom. Particularly for operating very large lens systems it is advantageous to mount the control sleeve remotely with respect to the lens system. The operation of the control sleeve is as described above except that the focus control is accomplished by conventional electric circuitry instead of by direct mechanical coupling.

As is clear from the above description of the preferred embodiment, many modifications and variations can be made in the present invention and also variations in detail and design can be employed within the scope of the present invention. All such variations and modifications are to be included within the scope of the present invention.

What is claimed is:

1. A zoom control for a lens system having a movable zoom component for selectively increasing and decreasing the image magnification of an object on a given focal plane, comprising:

variable speed drive means cooperating with said zoom component for driving said zoom component toward and away from said focal plane at any of a plurality of different speeds, control means including a control member movable between a null position and a plurality of spaced positions on each side of said null position, said null position corresponding to zero speed of said drive means and each of said positions on one side of said null position corresponding to a respective one of said speeds of said drive means for driving said zoom component in a direction toward said focal plane and each of said positions on the other side of said null position corresponding to a respective one of said speeds of said drive means for driving said zoom component in a direction away from said focal plane, electric circuit means operatively connecting said control means to said drive means for actuating said drive means at a speed which corresponds to the selected one of said plurality of positions of said control member in response to movement of said member to such selected position, and cylindrical housing means housing said lens system and adapted to be stabilized by the hand of the operator, said control means being supported by said housing means substantially within the axial dimension of said housing means so that the operator can with one hand stabilize the lens system and operate said control means.

2. A combined focus and zoom control system for cameras, having a motor driven zoom component and an independently adjustable focusing component comprising:

manually rotatable and axially displaceable sleeve means sensing means cooperating with said sleeve means for sensing the axial position thereof;

means coupling said sensing means with the drive motor of the zoom component for moving such zoom component toward and away from the focal plane of the camera at a speed proportional to the axial displacement of said sleeve means;

means coupling said sleeve means with the focusing component for moving such focusing component axially a distance which is proportional to the rotational displacement of said sleeve means, whereby both focusing and variable speed zooming are accomplished by actuation of a single sleeve means.

3. A lens system for cameras comprising:

sleeve means co-axial with and surrounding the lens system;

means mounting said sleeve means for axial and rotational movement;

sensing means cooperating with said sleeve means for sensing the axial position thereof;

a zoom component mounted for axial movement within said sleeve means;

electric drive means cooperating with said zoom component for moving the latter along said axis at any of a plurality of different speeds;

electric circuit means operatively connecting said sensing means with said electric drive means, said circuit means adapted to actuate said drive means to move said zoom component in the direction of, and at a speed proportional to, the axial displacement of said sleeve means;

a focusing component also movable along said axis; and coupling means, coupling said sleeve means to said focusing component for moving the latter axially in response to rotation of said sleeve means;

whereby both focusing and variable speed zooming are accomplished by a single sleeve means.

4. The zoom control according to claim 1 further comprising a support member supporting said control member for relative movement therewith, and said electric circuit means comprising a linear Hall effect transducer carried by one of said members and permanent magnet means carried by the other of said members, said transducer and said magnet cooperating for sensing the magnitude of the relative movement between said members.

5. The zoom control according to claim 1 further comprising a focusing component movable on the same axis as said zoom component, means supporting said control member for movement in opposite directions along a linear path respectively away from and toward said null position and for rotational movement about said linear path, and coupling means coupling said control member with said focusing means for moving the latter axially in a direction and for a distance proportional respectively to the direction and amount of rotation of said control member.

6. The zoom control according to claim 1 wherein said drive means has infinitely variable forward and reverse speeds and said control means has an infinite number of linear positions on each side of said null position for actuating said drive means at any of said speeds thereof.

7. The zoom control according to claim 1 wherein said control means comprises an axially reciprocable and manually rotatable sleeve member surrounding portions of said lens system and concentric therewith.

8. The zoom control according to claim 1 further comprising support means supporting said control member for relative movement therewith, and said electric circuit means comprising a Hall device cooperating with a pair of relatively movable magnetically interacting portions, one of said portions being fixed to said movable control member and the other of said portions being fixed to said support means for sensing the linear position of said control member and for controlling the speed of said drive means in response thereto.

9. The zoom control according to claim 1 wherein said drive means comprises an electric motor and said electric circuit means comprises:
motor stall current sensing means and
means cooperating with said motor stall current sensing means for instantaneously directing such currents away from said motor to prevent damage thereto.

10. The zoom control according to claim 1 wherein said drive means comprises an electric motor and said electric circuit means comprises a transistor bridge circuit for directing current to flow through said motor in a direction corresponding to the direction of movement of said control member out of its null position.

11. The zoom control according to claim 1 further comprising a support member for supporting said control member and means coupling said members for a relative axial movement and for coupled rotational movement, said coupling means comprising biasing means permanently urging said control member toward said null position thereof.

12. A combined focus and zoom control system for cameras, having a motor driven zoom component and an independently adjustable focusing component comprising:
manually moveable sleeve means having a first degree of freedom of movement and a second degree of freedom of movement;
sensing means cooperating with said sleeve means for sensing the position thereof within said first degree of freedom of movement;
means coupling said sensing means with the drive motor of the zoom component for moving such zoom component toward and away from the focal plane of the camera at a speed proportional to the displacement of said sleeve means in said first degree of freedom of movement;
means coupling said sleeve means with the focusing component for moving such focusing component axially a distance which is proportional to the displacement of said sleeve means in said second degree of freedom of movement;
whereby both focusing and variable speed zooming are accomplished by actuation of a single sleeve means.

* * * * *